US006920866B2

(12) United States Patent
Leini et al.

(10) Patent No.: US 6,920,866 B2
(45) Date of Patent: Jul. 26, 2005

(54) METHOD AND ARRANGEMENT FOR THE TRANSPORT OF FUEL AT A COMBUSTION ENGINE

(75) Inventors: Christer Leini, Katrineholm (SE); Jan-Åke Bergstrand, Katrineholm (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/477,009

(22) PCT Filed: Apr. 24, 2002

(86) PCT No.: PCT/SE02/00790

§ 371 (c)(1),
(2), (4) Date: Nov. 6, 2003

(87) PCT Pub. No.: WO02/090752

PCT Pub. Date: Nov. 14, 2002

(65) Prior Publication Data

US 2004/0163631 A1 Aug. 26, 2004

(30) Foreign Application Priority Data

May 8, 2001 (SE) .............................................. 0101590

(51) Int. Cl.⁷ .......................... F02M 37/04; F02M 55/00
(52) U.S. Cl. ....................................... 123/514; 123/516
(58) Field of Search ................................ 123/514, 516, 123/518, 519, 520, 541; 137/571

(56) References Cited

U.S. PATENT DOCUMENTS

| | | | | | |
|---|---|---|---|---|---|
| 4,354,521 A | * | 10/1982 | Harde | .......................... | 137/571 |
| 4,703,771 A | * | 11/1987 | Mimura | ....................... | 137/142 |
| 4,932,609 A | * | 6/1990 | Secchiaroli et al. | ..... | 244/135 C |
| 5,197,443 A | * | 3/1993 | Hodgkins | .................... | 123/514 |
| 5,197,444 A | * | 3/1993 | Lang et al. | .................. | 123/514 |
| 5,360,034 A | * | 11/1994 | Der Manuelian | ........... | 137/571 |
| 6,382,225 B1 | * | 5/2002 | Tipton | ........................... | 137/1 |

FOREIGN PATENT DOCUMENTS

| | | |
|---|---|---|
| EP | 00 43283 | 1/1982 |
| GB | 1 433 875 | 4/1976 |
| GB | 2 202 034 | 9/1998 |
| SE | 509 113 | 12/1998 |
| WO | WO 01/21429 A1 * | 3/2001 |

* cited by examiner

*Primary Examiner*—Weilun Lo
(74) *Attorney, Agent, or Firm*—Ostrolenk, Faber, Gerb & Soffen, LLP

(57) ABSTRACT

Fuel for an engine is supplied from a first fuel tank and return fuel from the engine is gathered in a second fuel tank for resupply to the engine. The second fuel tank constitutes a fuel tank which is connected to and fillable from the first fuel tank and the engine receives all its fuel from the second tank. The engine is provided via a fuel pump with fuel from the second fuel tank which is itself supplied via another fuel pump with fuel from the first fuel tank. The second fuel tank is provided with fuel venting.

8 Claims, 1 Drawing Sheet

METHOD AND ARRANGEMENT FOR THE TRANSPORT OF FUEL AT A COMBUSTION ENGINE

BACKGROUND OF THE INVENTION

1. Technical Field

The present invention relates both to a method for fuel transfer in combustion engines including resupply of return fuel to the engine, and to an arrangement for fuel transfer in combustion engines, including a second fuel tank to receive return fuel from the engine and supply it to the engine in addition to fuel from a first fuel tank.

2. State of the Art

In combustion engines of various kinds it is usual for fuel to be drawn from a fuel tank to the engine and for any excess fuel to be returned to the fuel tank. This entails the possibility of dirt; air, gas and heat also reaching the fuel tank, which may result in various kinds of problems. In particular, in cases where a diesel engine is provided with fuel injectors which are intended to be constantly open, there is a large return flow of fuel which is very hot and contains a great deal of air. The high return fuel temperature may make it necessary to use heat-tolerant material, e.g. steel, for the fuel tank instead of, for example, plastic. Another type of problem is that long fuel lines may make it difficult to meet essential positive and negative pressure requirements with respect to the fuel pump situated adjacent to the engine. Moreover, too much air in return fuel can cause excessive pressure in the fuel tank, and further possible problems can be caused by dirt accumulation in the fuel tank.

Returning excess fuel to the fuel tank may result in a flowmeter situated in the fuel line from the fuel tank not providing sufficiently accurate information about the engine's fuel consumption, since the return flow makes accurate measurement of fuel consumption difficult. An attempt to solve this problem is referred to in GB 1 433 875 whereby return fuel is gathered in an extra fuel tank which can be connected, when it reaches a sufficient fuel level, to the ordinary suction line between the fuel tank and the engine. This arrangement makes it possible for a flowmeter fitted close to the fuel tank to monitor fuel consumption with good accuracy, since return fuel does not reach the fuel tank. Even so, various problems may still arise, e.g. with regard to high pressure in fuel tanks or to long fuel lines and appropriate pressure at the fuel pump.

Against this background, there is a need for better solutions in this respect with a view to achieving; for example, greater operational reliability and simpler installation, particularly in cases where there is a large return flow of fuel.

OBJECTS OF THE INVENTION

The object of the invention is to make it possible to transfer fuel in a better manner than previously and by means of a better arrangement than previously. Another object is to prevent temperature increase and pressure increase in the fuel tank in order to be able to use simple material in its construction. A further object is to provide the possibility of flexibility regarding the location of various parts of the arrangement.

SUMMARY OF THE INVENTION

These objects are achieved according to the invention both by means of a method and apparatus of the invention. Fuel for an engine is supplied from a first fuel tank and return fuel from the engine is gathered in a second fuel tank for resupply to the engine. The second fuel tank constitutes a fuel tank which is connected to and fillable from the first fuel tank and the engine receives all its fuel from the second tank. The engine is provided via a fuel pump with fuel from the second fuel tank which is itself supplied via another fuel pump with fuel from the first fuel tank. The second fuel tank is provided with fuel venting.

Fuel from the ordinary or first fuel tank is only supplied to the engine via a special second fuel tank in which return fuel from the engine is also gathered. This makes it possible to have a fuel pump on the engine provide the engine with fuel from the special fuel tank only, while another fuel pump may transfer fuel between the two fuel tanks. The result is good working conditions for the fuel pump adjacent to the engine. Further providing the fuel in the special fuel tank with venting prevents excessive pressure rise in fuel tanks and fuel lines due to air in the fuel. The special fuel tank thus serves as a fuel pressure equalizer.

The special fuel tank may advantageously be made of a heat-tolerant material to withstand heated return fuel and it may advantageously be of small volume relative to the ordinary fuel tank and be therefore easily kept well-filled, thereby reducing the risk of operational malfunction due to fuel splashing, e.g. on sharp bends. To eliminate the risk of fuel from the special fuel tank reaching the cylinders of the engine unintentionally, the special tank should advantageously be situated at a lower level than the engine's cylinders.

The solution according to the invention also makes it possible, for example, to divide the ordinary fuel tank into a number of separate fuel tanks, each of which may possibly be smaller than a normal single fuel tank. Advantageous fuel tank siting in, for example, a vehicle, may thus be achieved.

The invention will now be explained in more detail on the basis of an embodiment described with reference to the attached drawing.

DESCRIPTION OF AN EMBODIMENT

Figure 1:
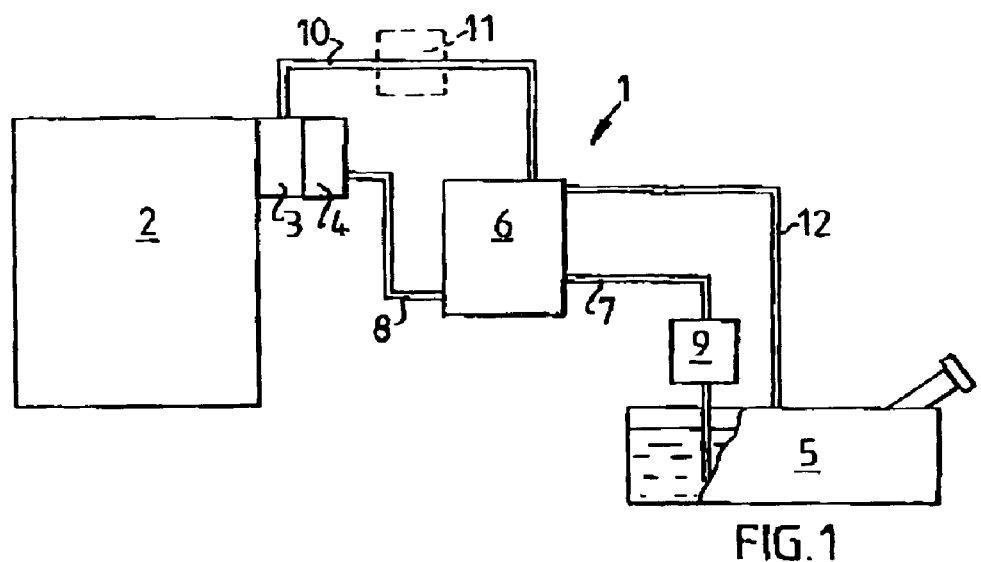
FIG. 1 depicts schematically an embodiment of an arrangement according to the invention.

In an arrangement 1 according to the invention depicted in FIG. 1, a combustion engine 2, which may for example be situated in a vehicle, is provided with an injection device 3 which is fed by a fuel pump 4. A first fuel tank 5, situated a short distance from the engine 2, e.g. at an appropriate location in a vehicle, serves as fuel storage facility for the engine 2. Between this first fuel tank 5 and the engine 2 there is a second fuel tank 6 which is connected to the fuel tanks by a first line 7 and to the fuel pump 4 by a second line 8. In the first line 7 there is a fuel pump 9, advantageously an electric pump, which with advantage is situated adjacent or near to the first fuel tank 5. From the injection device 3, a return line 10, possibly provided with a fuel cooler 11, leads to the second fuel tank 6. From the second fuel tank 6 an emergency return line 12 leads to the first fuel tank 5 so that any excess fuel in the second fuel tank 6 can flow back as necessary to the first fuel tank 5.

Figure 2:
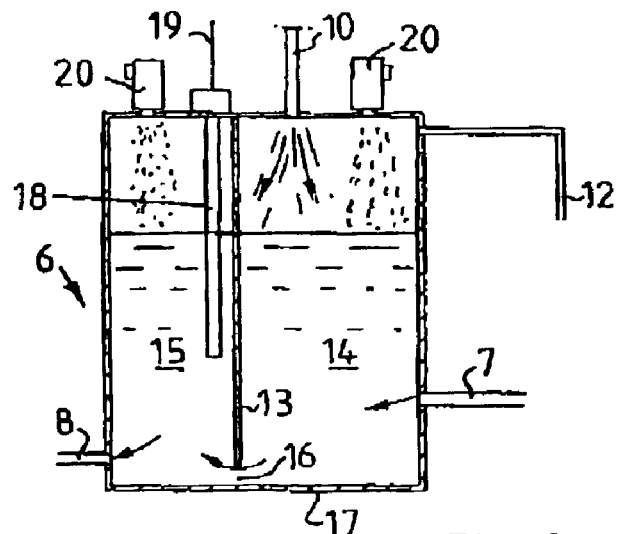
FIG. 2 depicts a section through the second fuel tank in FIG. 1.

FIG. 2 depicts in more detail the configuration of the second fuel tank 6. An intermediate wall 13 divides the fuel tank into two chambers, 14 and 15 which may communicate with one another via a gap 16 between the fuel tank bottom 17 and the intermediate wall 13. The first line 7 from the first fuel tank 5 leads into the first chamber 14, as too does the return line 10. Fuel is thereby supplied as indicated by the arrows pertaining to these lines so that a certain fuel level prevails. This fuel level is monitored by a level sensor 18 which is situated in the chamber 15 and which is connected by a signal line 19 to the fuel pump 9 in order to control the latter so that an intended fuel level is maintained by starting or stopping the fuel pump 9.

The emergency return line 12 is connected to the second fuel tank 6 at a level above the fuel level which may normally occur, subject to some variation, in the second fuel tank. This makes it possible, e.g. in the event of failure of the fuel pump 9 or the level sensor 18, to prevent pressure rise due to excess fuel. To make it easy to remove air from return fuel coming in via the return line 10, the return line 10 advantageously ends above the normal fuel surface, and the removal of this and other air is catered for by the chamber 14 being provided with at least one venting valve 20 which normally connects the chamber 14 to the surrounding atmosphere but which, upon such occurrences as overturn of the second fuel tank 6, closes the chamber 14 and prevents any possibility of fuel escaping. Such venting valves are well-known and therefore need no further description here. The chamber 15 is also advantageously provided with at least one corresponding venting valve 20.

There may also possibly be at the top of the intermediate wall 13 a gap similar to the gap 16, or a suitable number of apertures (not depicted), to allow communication also between the chambers 14 and 15 at the top, in the portion filled with air, of the second tank 6. This may result in a single venting valve 20 being sufficient.

Making it possible for the fuel in the second fuel tank 6 to be kept well-vented and at a reasonably constant level results in reliable fuel supply to the engine 2 via the second line 8, the inlet to which is situated low down in the chamber 15. The second fuel tank 6 also with advantage being of significantly smaller volume than the first fuel tank 5, advantageously not more than about one tenth of the latter's volume, means that fuel splashing is minimised and the inlet to the second line 8 always receives fuel even when the fuel level in the first fuel tank 5 is low and during violent manoeuvring of a vehicle.

The fuel pump 4 is advantageously driven mechanically by the engine, while the fuel pump 9 is with advantage driven electrically and may, as previously mentioned, be controlled via the level sensor 18. This results in great freedom with regard to siting the fuel pump 9. The first fuel tank 5 may possibly be divided into a number of fuel tanks which may be situated appropriately on a vehicle, e.g. so as to make good use of available space, and such fuel tanks may also advantageously be connected to one another to enable them to be served by a common fuel pump.

The material of the second fuel tank 6 may advantageously be, for example, steel to tolerate high fuel temperatures, whereas the material of the first fuel tank 5, which is subject to only limited temperatures, may advantageously be, for example, plastic.

The drawing depicts the various lines as single lines, but it is of course possible, where so desired, to replace single lines by, for example, dual lines. In certain configurations this may in particular be advantageous as regards the second line 8 and the return line 10.

It is also advantageous that the first fuel tank 5, like the second fuel tank 6, be provided with a venting valve (not depicted). It is also advantageous for it to be provided with a sensor (not depicted) connected to a fuel volume meter.

In long vehicles, e.g. buses, there is usually great distance between engine and fuel tank. This has previously made it necessary, when a fuel stoppage occurs, to use a hand pump to bring fresh fuel to the engine before attempting to start up again. Such problems are obviated by a solution according to the invention in that the risk of fuel stoppage is reduced and also that the fuel pump 9 can be run without having to start the engine. This means that fuel can be mobilised as necessary even when the engine is switched off.

What is claimed is:

1. An arrangement for fuel transfer in a combustion engine comprising a combustion engine having a fuel inlet;

a first fuel tank which is the main tank;

a second fuel tank including a return line connected to receive return fuel from the engine, the second fuel tank is also connected to the engine fuel inlet; and at least one fuel pump for conveying fuel to the engine inlet, wherein the return line from the engine leads into the second fuel tank above the normal fuel level therein;

wherein the second fuel tank is connected to and fillable from the first fuel tank so that the engine receives all its fuel from the second tank, and the at least one fuel pump is between the engine and the second fuel tank for pumping fuel to the engine inlet;

further comprising a second fuel pump between the first fuel tank and the second fuel tank for pumping fuel from the first tank to the second tank, wherein the second fuel pump between the first fuel tank and the second is controlled by the fuel level in the second fuel tank; and at least one vent on the second fuel tank for venting of the fuel therein to the surrounding atmosphere.

2. An arrangement according to claim 1, wherein the second fuel tank has a smaller volume than the first fuel tank.

3. An arrangement according to claim 1, further comprising an intermediate wall dividing the second fuel tank into two mutually communicating chambers wherein fuel is supplied to one of the chambers from the other of the chambers.

4. An arrangement according to claim 1, further comprising an emergency return line which leads from the second fuel tank to the first fuel tank and an inlet to the emergency return line situated in a topmost part of the second fuel tank.

5. An arrangement according to claim 1, wherein the outlet to the engine from the second fuel tank is situated low down in the fuel tank.

6. An arrangement according to claim 2, wherein the volume of the second tank is not more than about one-tenth of the volume of the first fuel tank.

7. An arrangement of claim 4, wherein the outlet to the engine from the second fuel tank is situated low down in the fuel tank.

8. An arrangement of claim 1, wherein said return line and said vent are arranged for venting air returning to the second fuel tank via the return line.

* * * * *